(12) United States Patent
Bone et al.

(10) Patent No.: US 8,924,515 B1
(45) Date of Patent: Dec. 30, 2014

(54) DISTRIBUTION OF APPLICATIONS OVER A DISPERSED NETWORK

(75) Inventors: Ian M. Bone, Seattle, WA (US); Jun Zhou, Mason, OH (US); Alexandre P. Moura, Kirkland, WA (US); Eden Jn Baptiste, Orlando, FL (US); Xiaochuan Qin, Seattle, WA (US); Ethan Z. Evans, Snoqualmie, WA (US); Richard D. Krog, Seattle, WA (US); Mario Vargas Adoc, Jr., Castro Valley, CA (US); Kerry Chang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 13/408,680

(22) Filed: Feb. 29, 2012

(51) Int. Cl.
*G06F 15/16* (2006.01)

(52) U.S. Cl.
USPC .......................................................... 709/219

(58) Field of Classification Search
USPC ................................................. 709/217, 219
See application file for complete search history.

(56) References Cited

U.S. PATENT DOCUMENTS

| | | | |
|---|---|---|---|
| 7,953,842 B2 * | 5/2011 | Dillon et al. | 709/224 |
| 8,738,437 B2 * | 5/2014 | Gailey et al. | 705/14.41 |
| 2002/0138640 A1 * | 9/2002 | Raz et al. | 709/231 |
| 2003/0152034 A1 * | 8/2003 | Zhang et al. | 370/252 |
| 2005/0192099 A1 * | 9/2005 | Nguyen et al. | 463/42 |
| 2007/0208751 A1 * | 9/2007 | Cowan et al. | 707/10 |
| 2008/0102954 A1 * | 5/2008 | Schueller | 463/40 |

* cited by examiner

*Primary Examiner* — Quang N Nguyen
*Assistant Examiner* — Andrew Woo
(74) *Attorney, Agent, or Firm* — Thomas | Horstemeyer, LLP

(57) ABSTRACT

Disclosed are various embodiments for facilitating anticipatory distribution of applications to a network of remote hosts. A demand for each of the applications is calculated. Based on criteria within the demand and computing resources available, remote hosts are selected to receive the applications. Transmissions of the applications to the selected remote hosts are scheduled and monitored for completion according to the schedule.

21 Claims, 4 Drawing Sheets

DISTRIBUTION OF APPLICATIONS OVER A DISPERSED NETWORK

BACKGROUND

Many interactive applications require a prompt, responsive user-interface for the application to be operable and for users to receive a satisfactory experience. Additionally, users may prefer an application to be available for use at the time it is requested.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating remote execution of applications through anticipatory distribution of the applications to a network of computing devices. Many interactive applications require a prompt, responsive user-interface for the application to be operable and for users to receive a satisfactory experience. Various embodiments of the present disclosure are configured to execute applications in computing devices selected based at least upon the ability to provide a responsive user-interface for the application. To this end, computing devices may be chosen to provide execution of an application based on various factors such as network and computing resources available, network path latency, reliability, and/or other factors.

Under some circumstances, a dispersed network of computing devices may provide an improved level of responsiveness due to the potential to be located in close proximity to the clients, and the ability to easily scale to meet demand. However, in order to employ a given computing device for remote execution, the application should reside on the computing device or be promptly transferable to it upon request. Due to the large size of many applications, limited network bandwidth, limited computing resources and/or other factors, an "on-demand" distribution of an application to remote computing devices may not be practicable for many applications. Therefore, in order to have a given application resident on a computing device proximate to a potential client by the time it may be requested, an anticipatory distribution of the application may be used. In the following discussion, a general description of the system for distribution and its components is provided, followed by a discussion of the operation of the same.

Figure 1:
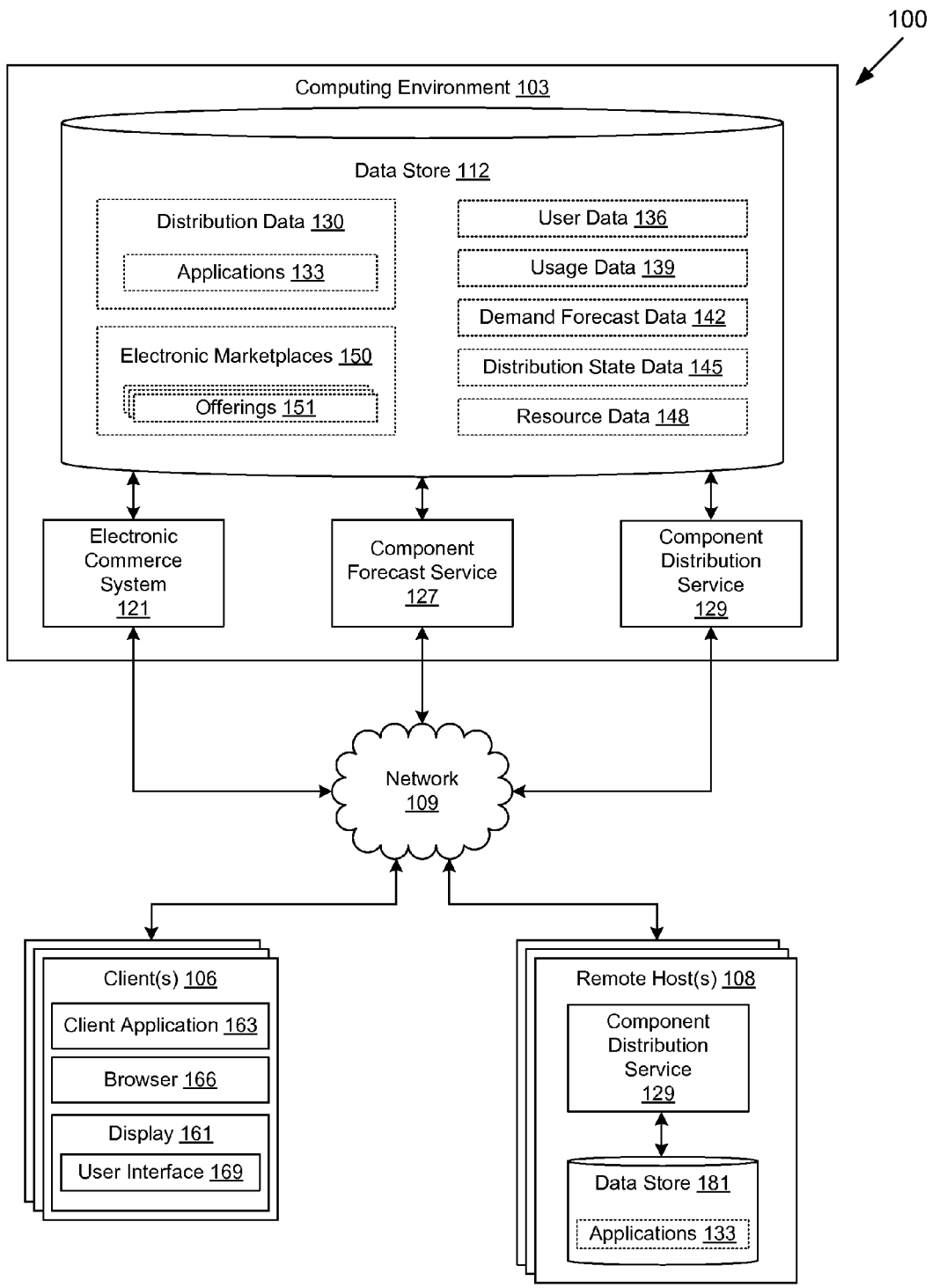
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 and remote hosts 108 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may comprise a plurality of servers or other computing devices that are arranged, for example, in one or more server banks or computer banks or other arrangements. For example, the computing environment 103 may comprise a cloud computing resource, a grid computing resource, and/or any other distributed computing arrangement. The computing environment 103 may be located in a single installation or may be distributed among many different geographical locations.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include an electronic commerce system 121, a component forecast service 127, a component distribution service 129, and other applications, services, processes, systems, engines, or functionality not discussed in detail herein. The electronic commerce system 121 is executed in order to facilitate the online purchase of items from one or more electronic marketplaces over the network 109. The electronic commerce system 121 also performs various backend functions associated with the online presence of an electronic marketplace in order to facilitate the online purchase of items. For example, the electronic commerce system 121 generates content pages such as, for example, web pages and/or other types of network content that are provided to clients 106 for the purposes of promoting and selecting items for purchase, rental, download, lease, or any other forms of consumption.

The component forecast service 127 is executed in order to facilitate generating a distribution of remote hosts 108 to receive an application. The distribution of remote hosts 108 may include specific individual remote hosts 108, criteria for selecting the remote hosts 108, alternate remote hosts 108, a schedule for distribution and/or other data related to the distribution of the application as can be appreciated. As is described in further detail herein, the distribution of remote hosts 108 may be based upon demand forecast data, usage data, resource data, user data and/or other data stored in the data store 112.

The component distribution service 129 is executed in order to facilitate the timely distribution of applications to the remote hosts 108. To this end, the component distribution service 129 may communicate with remote hosts 108 over various protocols such as, for example, hypertext transfer protocol (HTTP), file transfer protocol (FTP), HTTP Secure (HTTPS), simple object access protocol (SOAP), representational state transfer (REST), user datagram protocol (UDP), transmission control protocol (TCP), and/or other protocols for communicating data over the network 109. In various embodiments, the component distribution service 129 may support the use of any cast services and/or peer-to-peer (P2P) protocols such as, for example, BitTorrent, for data communications. Additionally, the component distribution service 129 may monitor the progress of the scheduled distributions to ensure completion of the transfers occur according to the schedule.

The data stored in the data store 112 includes, for example, distribution data 130, user data 136, usage data 139, demand forecast data 142, distribution state data 145, resource data 148, electronic marketplace 150, and potentially other data. The distribution data 130 may include information related to a plurality of applications 133 that are or will be made available through the electronic marketplace 150 for execution on remote hosts 108. Alternatively, the applications 133 may correspond to code that is executable within another type of device, but is not executable directly by the central processing unit (CPU) of the remote hosts 108. Such applications 133 may be referred to as "binaries," read-only memory images (ROMs), and other terms. The various other data stored in distribution data 130 may include, for example, virtual machines, audio encoders, video encoders, and/or any other data related to applications 133.

The user data 136 includes various data related to the users of the applications 133 and operators of the remote hosts 108, such as, for example, security credentials, application preferences, billing information, location, recent network addresses, and so on. Security credentials may comprise passwords, digital certificates, secret keys, digital watermark identifiers, and/or other security related data. The usage data 139 includes various data related to past usage of the applications 133 by a user. The usage data 139 may include the time and duration of each application session by a user, performance metrics associated with the application session, network addresses of the client 106 and the remote host 108, and other data associated with usage of the application.

The demand forecast data 142 includes data that may be used in order to project demands for remote execution of the applications 133. To this end, the demand forecast data 142 may include historical demands for specific applications 133 and/or for general classes of applications, release dates for applications 133, dates for release of updated versions of applications 133, and/or other data relevant to forecasting demand for applications 133. Additionally, the demand forecast data 142 may specify portions of the demand data by location of users, by age of the application 133, by network service provider and other demand criteria as can be appreciated.

The distribution state data 145 includes the current state of transmissions of the application 133 to the selected remote hosts 108. The distribution state data 145 may include the transmission start and target finish times, schedule thresholds or milestones, transfer rate, estimated finish time, alternate remote hosts 108, communications protocol used, and/or other data associated with transmission of the application 133. The resource data 148 may describe the computing and network resources of the remote hosts 108. The resource data 148 may include the computing and network resources that are presently available and utilized, as well as the schedule for both. The resources described may include CPU utilization, CPU benchmark results, graphics processor benchmark results, memory available, location, storage available, applications 133 and associated data resident in storage, network bandwidth, network latency, network service provider and/or other resource data as can be appreciated.

The electronic marketplace 150 corresponds to a network site through which users may initiate remote execution of applications 133, submit requests for new applications 133, "pre-order" remote execution sessions of applications 133 prior to release date, and/or potentially other data. The offerings 151 relate to applications 133 that are available or may be made available for remote execution by a remote host 108.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 161. The display 161 may comprise, for example, one or more devices such as cathode ray tubes (CRTs), liquid crystal display (LCD) screens, gas plasma-based flat panel displays, LCD projectors, and/or other types of display devices.

The client 106 may be configured to execute various applications such as a client application 163, a browser 166, and/or other applications. The client application 163 is executed to allow a user to launch, join, play, or otherwise interact with an application 133 executed in the remote host 108. In some embodiments, the client application 163 may also provide geographic location data through the use of the Global Positioning System (GPS), cell network positioning, Wi-Fi™ positioning and/or other location techniques. The browser 166 may be executed in a client 106, for example, to access and render network pages, such as web pages, or other network content served up by the computing environment 103 and/or other servers. The client 106 may be configured to execute applications beyond the client application 163 and the browser 166 such as, for example, email applications, instant message applications, and/or other applications. Any applications executed on the client 106 may render a user-interface 169 on the display 161.

The remote host 108 may comprise, for example, a personal computer or any other system providing computing capability. Alternatively, a plurality of remote hosts 108 may be employed that are arranged, for example, in one or more computer banks or other arrangements. For example, a plurality of remote hosts 108 together may comprise a cloud computing resource, a grid computing resource, and/or any other distributed computing arrangement. Such remote hosts 108 may be located in a single installation or may be distributed among many different geographical locations. For purposes of convenience, the remote host 108 may be referred to herein in the singular. Even though the remote host 108 is referred to in the singular, it is understood that a plurality of remote hosts 108 may be employed in the various arrangements as described above.

Various applications and/or other functionality may be executed in the remote host 108 according to various embodiments. Also, various data is stored in a data store 181 that is accessible to the remote host 108. The data store 181 may be representative of a plurality of data stores 181 as can be appreciated. The data stored in the data store 181 includes, for example, applications 133 and potentially other data associated with the operation of the various applications and/or functional entities described below. The components executed on the remote host 108, for example, include various embodiments of the component distribution service 129, and other applications, services, processes, systems, engines, or functionality not discussed in detail herein.

Next, a general description of the operation of the various components of the networked environment 100 is provided. As discussed previously, in order to provide a satisfactory user-experience for remote execution of applications 133, remote hosts 108 that are proximate to clients 106 may be employed to execute the applications 133. However, due to the large size of many applications 133, an on-demand distribution of an application 133 to remote hosts 108 may not be practicable for many applications 133. Therefore, in order to have a given application 133 resident on a remote host 108 that is proximate to a potential client 106 at the time it may be requested, an anticipatory distribution of the application 133 may be used.

To begin, an application 133 is evaluated by the component forecast service 127 for distribution to the remote hosts 108. The component forecast service 127 may first generate a demand forecast for a given application 133 using usage data 139, demand forecast data 142, and/or other data. The demand forecast includes the anticipated demand for remote execution of the application 133 by clients 106 and may be based upon several factors such as, for example, recent demand for the application 133, demand for other applications 133 within a similar classification, pre-orders or requests for offerings 151 of an application 133, upcoming releases of new versions of and/or competitors to a given application 133, and other factors influencing demand as can be appreciated.

Furthermore, the demand forecast may include at least the computing resources needed within one or more time periods and may be segmented by geographic location, by network service provider, specific computer resources, specific network resources, and/or other classifications. The computing resources may include a number of remote hosts 108, a session capacity for an application 133, and/or other expressions of computing resources. As a non-limiting example, the demand forecast may identify an anticipated demand for the vicinity of Honolulu, Hi. of 1000 simultaneous sessions of the newest 3D game by 12PM on December 25th. The demand forecast may further specify a minimum graphics processor benchmark score, and that 300 of the users may be connecting from network provider X and 700 of the users connecting from network provider Y.

Upon creating the demand forecast, the component forecast service 127 may proceed to determine the remote hosts 108 to receive the application 133, as well as a schedule by which the transmission should be complete. To this end, the component forecast service 127 may employ the resource data 148 and/or other data. The remote hosts 108 may be determined by selecting remote hosts 108 from the resource data 148 that satisfy the criteria and/or classifications specified in the demand forecast. In various embodiments, the component forecast service 127 may choose alternate remote hosts 108 in the event the eventual distribution of the application 133 fails to complete on schedule.

In some instances, remote hosts 108 may not be available that meet each selection criteria specified. Under these circumstances, the component forecast service 127 may determine the remote hosts 108 that would satisfy the demand forecast as nearly as possible based on the selection criteria, the resource data 148 and/or other data. The selection of the remote hosts 108 may be carried out using pattern-matching, correlation and/or other methods of selection as can be appreciated. In some embodiments, the selection criteria may be weighted to indicate necessity or relative preference such that, for example, the component forecast service 127 prefers to select remote hosts 108 that already have the application 133 in storage. Additionally, the weights may indicate, for example, that the geographic location of a remote host 108 is more important for selection than the network service provider.

The remote hosts 108 selected by the component forecast service 127 for distribution of the application 133, as well as the scheduled completion time, any alternate remote hosts 108, and/or other associated data may be passed to the component distribution service 129. The component distribution service 129 schedules transmission of the application 133 to the remote hosts 108 based on the usage data 139, distribution state data 145, resource data 148, and/or other data. As a non-limiting example, a given remote host 108 may presently report sufficient network and storage resources in the resource data 148 to complete transmission of the application 133 within one day. However, the distribution state data 145 indicates the remote host 108 has two other applications 133 scheduled for transmission. In light of the eventual contention for the resources, the component distribution service 129 may adjust the transmission schedule for one or more of the transmissions.

The component distribution service 129 may transmit the application 133 to the remote hosts 108 directly and/or P2P protocols may be employed to supplement distribution to the remote hosts 108. As a non-limiting example, the component distribution service 129 may choose to use the P2P protocol, BitTorrent, to distribute the application 133 to some remote hosts using the same network service provider, while using the traditional client-server model for distribution to other remote hosts 108. Furthermore, the method of distribution chosen may be limited by the network service provider, preferences of the operators of the remote hosts 108, and/or for other reasons that may be discovered or specified in the resource data 148. Additionally, the component distribution service 129 executing on the computing environment 103 may delegate a portion of the transmission tasks to the component distribution service 129 executing in one or more remote hosts 108. In some embodiments, the component distribution service 129 executing on the remote hosts 108 may communicate with the computing environment 103 to access and store various data in the data store 112.

In various embodiments, the component distribution service 129 may modify all or a portion of the copies of the applications 133 transmitted to the remote hosts 108. The modifications may include an identifier such as, for example, a digital watermark, that may uniquely identify the application 133 provided to a remote host 108, a user, a group, and/or other objects to be identified. Furthermore, the modification may include encryption of the application 133 using various methods of public key and/or secret key cryptography such as, for example, advanced encryption standard (AES), triple data encryption standard (3-DES), Diffie-Hellman and/or other encryption techniques as can be appreciated.

The component distribution service 129 may maintain the state of the various transmissions, active and scheduled, within the distribution state data 145. Additionally, the component distribution service 129 may monitor the transmissions of the applications 133 to the selected remote hosts 108. In some embodiments, the component distribution service 129 may preemptively begin transmissions to alternate remote hosts 108 based on various factors such as, for example, failure of a remote host 108 to meet one or more schedule thresholds, interruptions of the transmission, and/or other factors as can be appreciated.

Figure 2:
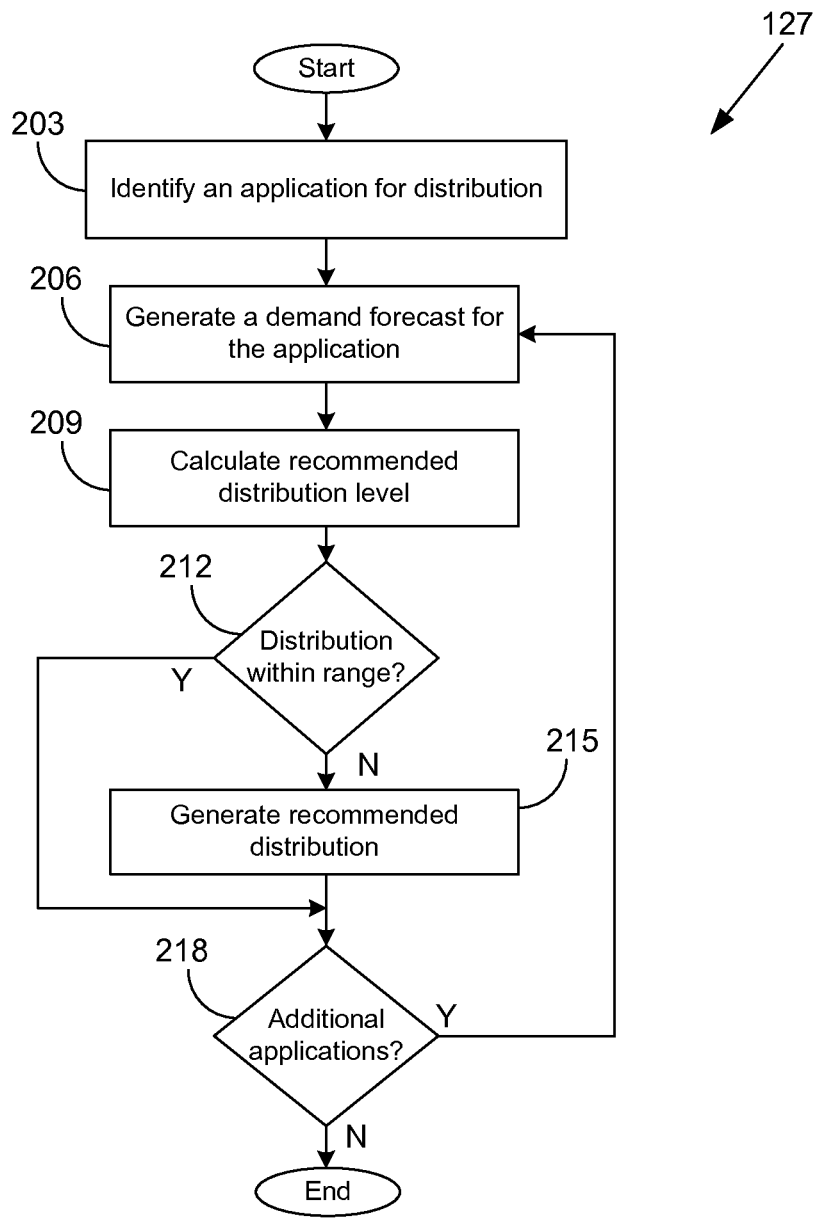
FIG. 2 is a flowchart illustrating examples of functionality implemented as portions of a component forecast service executed in a computing environment in the networked environment of FIG. 1 according to various embodiments of the present disclosure.

Referring next to FIG. 2, shown is a flowchart that provides one example of the operation of a portion of the component forecast service 127 according to various embodiments. It is understood that the flowchart of FIG. 2 provides merely an example of the many different types of functional arrangements that may be employed to implement the operation of the portion of the component forecast service 127 as described herein. As an alternative, the flowchart of FIG. 2 may be viewed as depicting an example of steps of a method implemented in the computing environment 103 (FIG. 1) according to one or more embodiments.

Beginning with box 203, an application 133 (FIG. 1) is identified by the component forecast service 127 for potential distribution to the remote hosts 108 (FIG. 1). Next, in box 206, the component forecast service 127 may first generate a demand forecast for a given application 133. As described previously, the demand forecast includes the anticipated demand for remote execution of the application 133 by clients 106 and may be based upon several factors such as, for example, recent demand for the application 133, demand for other applications 133 within a similar classification, pre-orders or requests for offerings 151 (FIG. 1) of an application 133, upcoming releases of new versions of and/or competitors to a given application 133, and other factors influencing demand as can be appreciated. Furthermore, the demand forecast may include at least the computing resources needed within one or more time periods and may be segmented by geographic location, by network service provider, specific computer resources, specific network resources, and/or other classifications. The computing resources may include a number of remote hosts 108, a session capacity for an application 133, and/or other expressions of computing resources.

Subsequently, in box 209, the component forecast service 127 may proceed to determine the remote hosts 108 to receive the application 133. The remote hosts 108 may be determined by selecting remote hosts 108 from the resource data 148 (FIG. 1) that satisfy the criteria and/or classifications specified in the demand forecast. In various embodiments, the component forecast service 127 may choose alternate remote hosts 108 in the event the eventual distribution of the application 133 fails to complete on schedule. If, in box 212, a sufficient number of remote hosts 108 currently exist that satisfy the criteria of the demand forecast and also have the application 133 in the data store 181 (FIG. 1), execution of the component forecast service 127 proceeds to box 218.

Alternatively, in box 215, the component forecast service 127 may proceed to determine the remote hosts 108 to which to transmit the application 133, as well as a schedule by which the transmission should be complete. Next, in box 218, the component forecast service 127 may evaluate any additional applications 133 for distribution. If additional applications 133 exist, execution of the component forecast service 127 may return to box 206. Alternatively, if no further applications 133 exist, execution of this portion of the component forecast service ends as shown.

Figure 3:
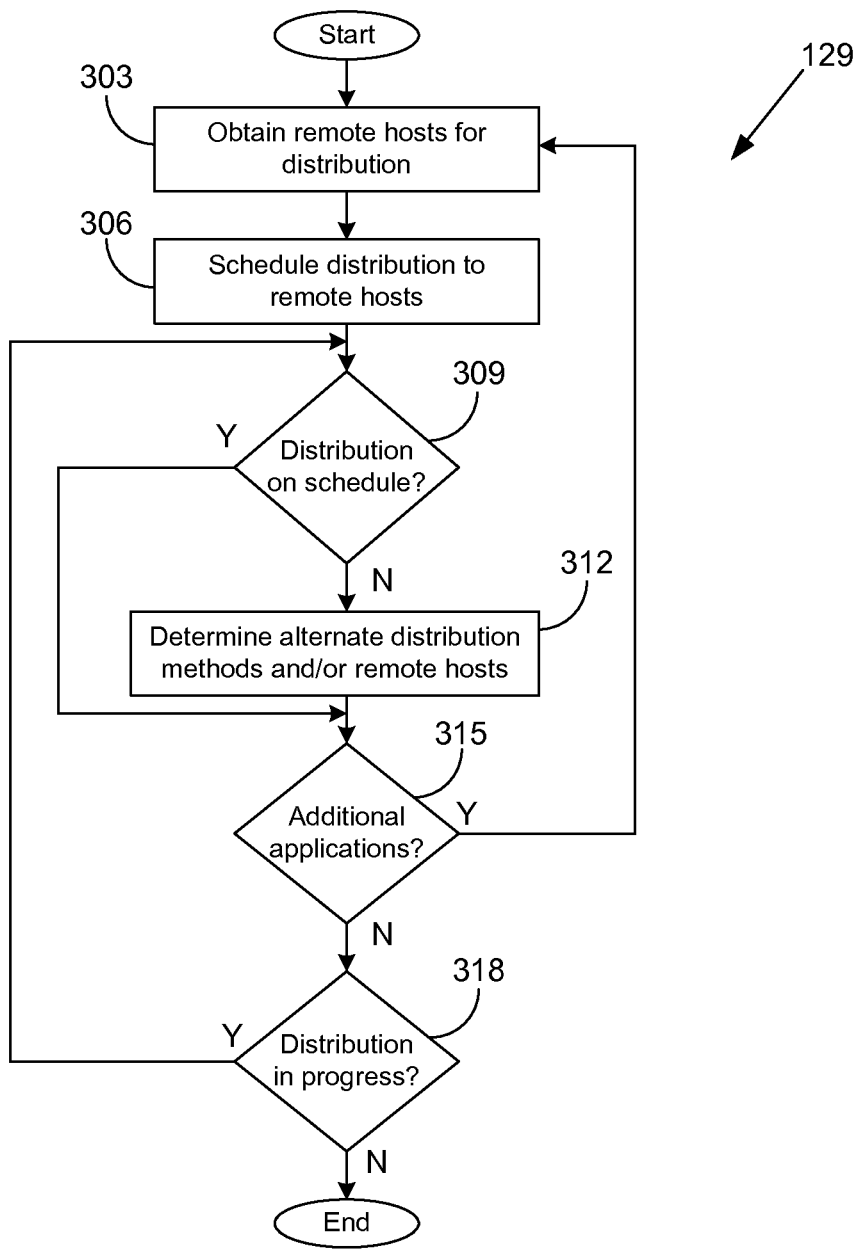
FIG. 3 is a flowchart illustrating examples of functionality implemented as portions of a component distribution service executed in a computing environment in the networked environment of FIG. 1 according to various embodiments of the present disclosure.

Moving on to FIG. 3, shown is a flowchart that provides one example of the operation of a portion of the component distribution service 129 according to various embodiments. It is understood that the flowchart of FIG. 3 provides merely an example of the many different types of functional arrangements that may be employed to implement the operation of the portion of the component distribution service 129 as described herein. As an alternative, the flowchart of FIG. 3 may be viewed as depicting an example of steps of a method implemented in the computing environment 103 (FIG. 1) according to one or more embodiments.

Beginning with box 303, the component distribution service 129 receives the remote hosts 108 (FIG. 1) selected by the component forecast service 127 for distribution of the application 133 (FIG. 1), as well as the scheduled completion time, any alternate remote hosts 108, and/or other associated data. Next, in box 306, the component distribution service 129 schedules transmission of the application 133 to the remote hosts 108, as described previously. In various embodiments, the component distribution service 129 may modify all or a portion of the copies of the applications 133 transmitted to the remote hosts 108. The modifications may include an identifier such as, for example, a digital watermark, that may uniquely identify the application 133 provided to a remote host 108, a user, a group, and/or other objects to be identified. Furthermore, the modification may include encryption of the application 133 using various methods of public key and/or secret key cryptography such as, for example, AES, 3-DES, Diffie-Hellman and/or other encryption techniques as can be appreciated.

Subsequently, in box 309, the component distribution service 129 evaluates the progress of the various active and schedule transmissions. If each transmission is on schedule, execution proceeds to box 315. However, if one or more transmissions of the applications 133 have failed, are behind schedule, and/or are in other suspect states, in box 312, the component distribution service 129 may begin transmissions to alternate remote hosts 108. If, in box 315, additional applications 133 remain to be scheduled, execution of the component distribution service 129 returns to box 303. Alternatively, if no further applications 133 exist to be scheduled, execution proceeds to box 318 where the component distribution service 129 determines if transmissions are currently scheduled or active. If transmissions are currently active or scheduled, execution returns to box 309. Alternatively, if no such transmissions exist, this portion of the component distribution service 129 ends as shown.

Figure 4:
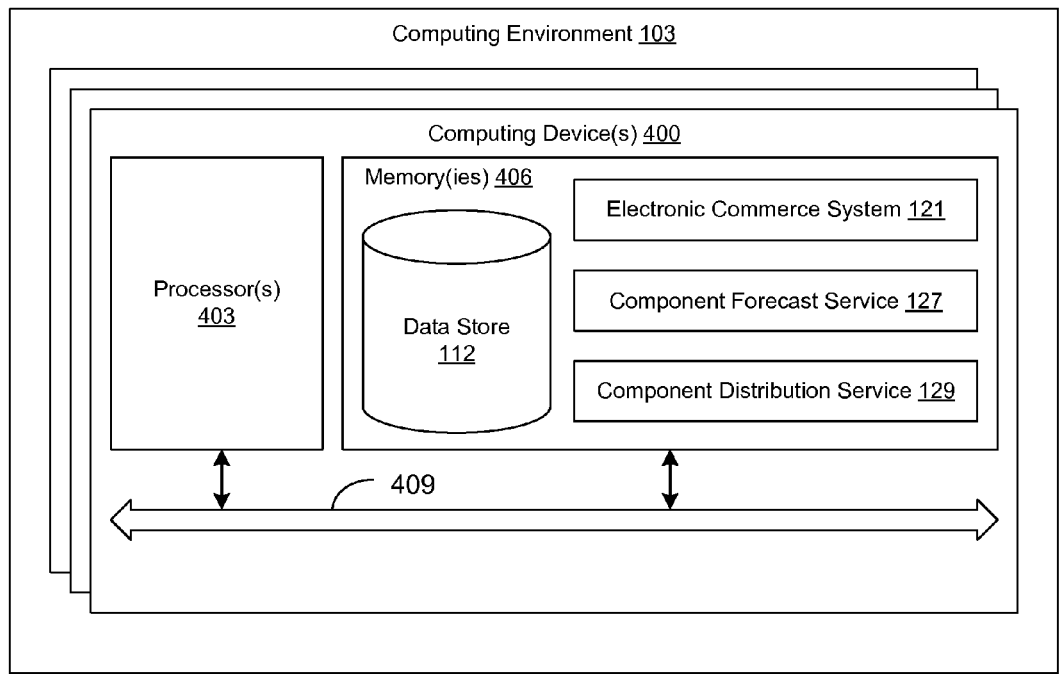
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 may comprise one or more computing devices 400. The computing device 400 includes at least one processor circuit, for example, having a processor 403 and a memory 406, all of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce system 121, component forecast service 127, component distribution service 129, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 121, component forecast service 127, component distribution service 129, and potentially other applications. and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the component forecast service 127 and component distribution service 129. If embodied in software, each block may represent a module, segment, or portion of code that comprises program instructions to implement the specified logical function(s). The program instructions may be embodied in the form of source code that comprises human-readable statements written in a programming language, or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 121, component forecast service 127, and component distribution service 129 that comprises software or code can be embodied in any non-transitory computer-readable medium for use by, or in connection with, an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by, or in connection with, the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program comprising:
   code that identifies a game to distribute to a plurality of remote hosts via a network, wherein the remote hosts are operable to remotely execute the game for a plurality of client devices;
   code that generates a demand forecast for the game based at least in part on a demand for a plurality of available games sharing a genre with the game, wherein the demand forecast projects at least a number of the client devices requesting a remote execution session of the game within a time period;
   code that determines distribution data for the game based at least in part on the demand forecast and a plurality of available computing resources, wherein the distribution data contains at least a number of the remote hosts to receive the game and a respective location;
   code that identifies a portion of the remote hosts having a plurality of attributes described in the distribution data;
   code that generates a schedule for a plurality of transmissions of the game to the portion of the remote hosts; and
   code that initiates the transmissions of the game to the portion of the remote hosts based at least in part on the schedule.

2. The non-transitory computer-readable medium of claim 1, wherein the available games further share an age with the game.

3. The non-transitory computer-readable medium of claim 1, wherein the program further comprises:
   code that identifies a plurality of delayed remote hosts from among the portion of the remote hosts, wherein the transmissions associated with the delayed remote hosts failed to meet at least one predefined threshold in the schedule;
   code that identifies a supplementary portion of the remote hosts having the attributes described in the distribution data; and
   code that modifies the schedule to include at least a plurality of supplementary transmissions of the game to the supplementary portion of the remote hosts.

4. The non-transitory computer-readable medium of claim 1, wherein a portion of the transmissions are fulfilled using a peer-to-peer network.

5. The non-transitory computer-readable medium of claim 1, wherein the game comprises machine code not directly executable by a central processing unit of individual ones of the portion of the remote hosts.

6. A system, comprising:
   at least one computing device; and
   a distribution service executable in the at least one computing device, the distribution service comprising:
      logic that identifies an application to distribute to a plurality of remote hosts via a network, wherein the remote hosts are operable to remotely execute the application for a plurality of client devices;
      logic that generates a demand forecast for the application based at least in part on a demand for a plurality of available applications, wherein the demand forecast projects at least a number of the client devices within a region requesting a remote execution session of the application within a time period;
      logic that determines distribution data for the application based at least in part on the demand forecast and a plurality of available computing resources, wherein the distribution data contains at least a number of the remote hosts to receive the application and a respective location;
      logic that determines a portion of the remote hosts to receive the application having a plurality of attributes described in the distribution data;
      logic that generates a schedule for a plurality of transmissions of the application to the portion of the remote hosts; and
      logic that initiates a plurality of transmissions of at least the application to the portion of the remote hosts according to the schedule.

7. The system of claim 6, wherein the application corresponds to a game selected from a library of games.

8. The system of claim 6, wherein the distribution service further comprises logic that modifies individual copies of the application communicated in the transmissions to include an identifier within the application.

9. The system of claim 8, wherein the identifier is a digital watermark.

10. The system of claim 6, wherein the distribution service further comprises logic that encrypts individual copies of the application communicated in the transmissions using a secret key.

11. The system of claim 10, wherein the secret key is communicated to the portion of the remote hosts based at least in part on authentication of an authorized user.

12. The system of claim 6, wherein the application comprises machine code not directly executable by a central processing unit of individual ones of the portion of the remote hosts.

13. The system of claim 12, wherein the transmissions further comprise a virtual machine directly executable by the central processing unit of the individual ones of the portion of the remote hosts and the application is executable by the virtual machine.

14. A method, comprising:
   identifying, in at least one computing device, an application to distribute to a plurality of remote hosts via a network, wherein the remote hosts are operable to remotely execute the application for a plurality of client devices;
   generating, in the at least one computing device, a demand forecast for the application based at least in part on a demand for a plurality of available applications, wherein the demand forecast projects at least a number of the client devices requesting a remote execution session of the application within a time period;
   determining, in the at least one computing device, distribution data for the application based at least in part on the demand forecast and a plurality of available computing resources, wherein the distribution data contains at least a number of the remote hosts to receive the game and a respective location;
   determining, in the at least one computing device, a portion of the remote hosts to receive the application having a plurality of attributes described in the distribution data;
   generating, in the at least one computing device, a schedule for a plurality of transmissions of at least the application to the portion of the remote hosts; and
   initiating, in the at least one computing device, the transmissions to the portion of the remote hosts based at least in part on the schedule.

15. The method of claim 14, further comprising:
   identifying, in the at least one computing device, a plurality of delayed remote hosts from among the portion of the remote hosts, wherein the transmissions associated with the delayed remote hosts failed to meet at least one predefined threshold in the schedule;

determining, in the at least one computing device, a supplementary portion of the remote hosts to receive the application based at least in part on the demand forecast and the available computing resources; and initiating, in the at least one computing device, a plurality of supplementary transmissions of at least the application to the supplementary portion of the remote hosts.

16. The method of claim 14, wherein the demand forecast is based at least in part on a count of user orders for the application prior to the application being available for execution.

17. The method of claim 14, wherein the demand forecast is based at least in part on past usage of the application by a plurality of users.

18. The method of claim 14, further comprising modifying, in the at least one computing device, individual copies of the application communicated in the transmissions to include an identifier within the application, wherein the identifier is unique to individual ones of the remote hosts.

19. The method of claim 14, further comprising encrypting, in the at least one computing device, individual copies of the application communicated in the transmissions using a secret key.

20. The method of claim 14, wherein the application comprises machine code not directly executable by a central processing unit of individual ones of the portion of the remote hosts.

21. The method of claim 20, wherein the transmissions further comprise a virtual machine directly executable by the central processing unit of the individual ones of the portion of the remote hosts and the application is executable by the virtual machine.

* * * * *